March 1, 1932. J. PRINZ 1,847,497

WATER HEATING APPARATUS

Filed July 13, 1929

Patented Mar. 1, 1932

1,847,497

UNITED STATES PATENT OFFICE

JOSEF PRINZ, OF DINSLAKEN, GERMANY

WATER HEATING APPARATUS

Application filed July 13, 1929. Serial No. 378,170.

This invention relates to a special construction of the boiler, designed to be used as water heating apparatus wherewith it is possible by means of heating pockets and large heating surfaces resulting therefrom to supply water heated to the desired temperature with a quick circulation, the apparatus itself being of very small dimensions. In the known boiler the boiler jacket and the furnace have juxtaposed water pockets distributed uniformly over the entire surface and communicating with upper and rear water chambers, a flue gas collecting chamber surrounded with water being provided in the boiler jacket into which the flue gases pass through narrow passages between the heating pockets. According to the present invention water enters at two oppositely situated points through the bottom into the outer chambers and is supplied directly above the pocket bottoms by a distributing plate arranged around the outer chamber simultaneously to the individual water pockets. Thus the water enters the pockets at the bottom where the heating effect is greatest, rises from the bottom in the pockets to the top and leaves the apparatus through a common upper collecting chamber. Any suitable means may be used as source of heat, for example gas burners, electric resistances or the like, arranged directly under the heating pockets, whereby the heating gases pass through the apparatus separated from but in the same direction as the water and like the water unite in a common collecting chamber, to be discharged through the chimney. Steam or hot water may also be used as heating medium, in which case the steam or hot water passes through the apparatus in the opposite direction to that of the heating gases, the steam or the hot water leaving the apparatus at the bottom through a special condensation piping.

To enable the same apparatus to be used for all heating media the distribution plates which, according to the main patent, are mounted in the heating gas flues are perforated so that steam and water, as much as possible uniformly distributed, flow along all the water chambers.

An embodiment of the invention is illustrated by way of example in the accompanying drawings in which.

Figure 1:
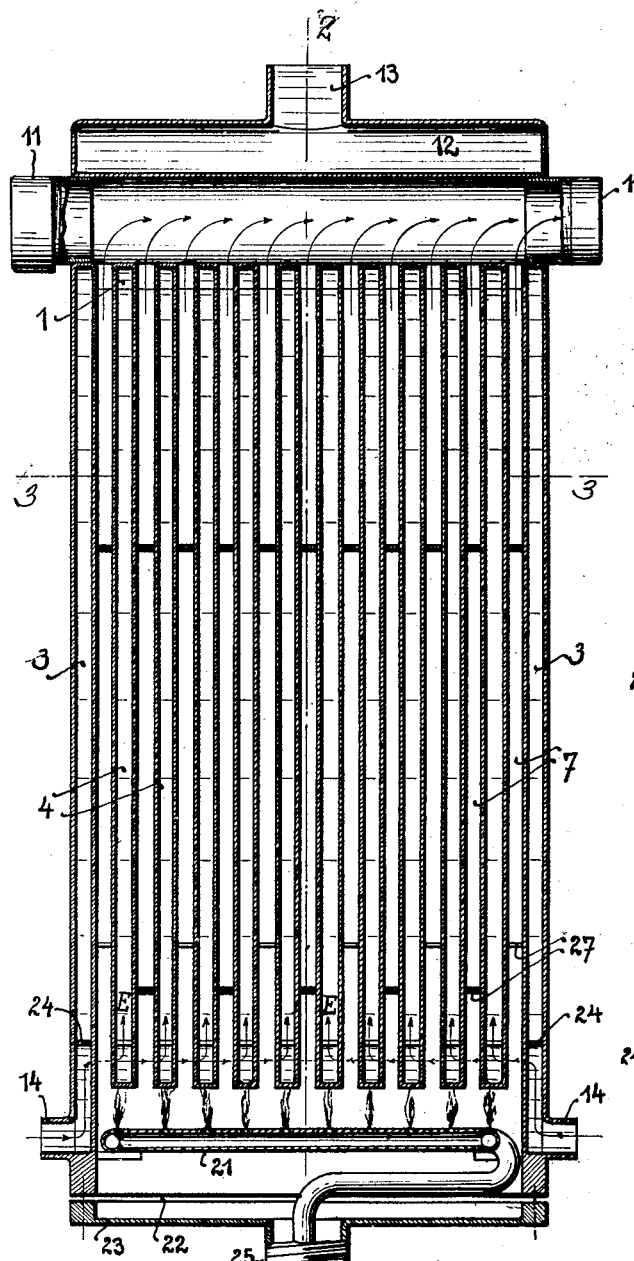
Fig. 1 shows a vertical section through the centre of the apparatus.
Figure 2:
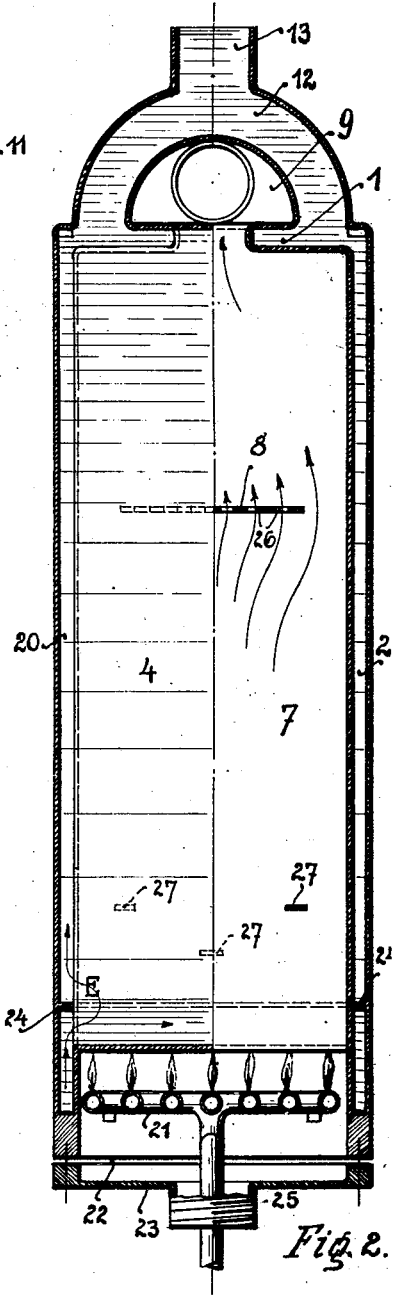
Fig. 2 is a cross-section on line 2—2 of Fig. 1, the right half being a section through the smoke chimney and the left half through the water chamber
Figure 3:
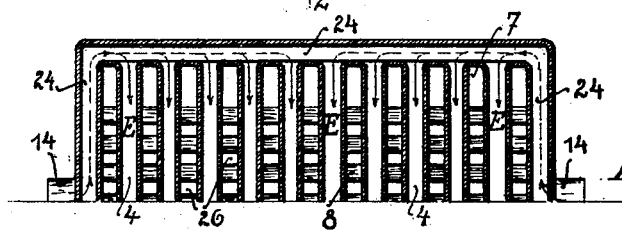
Fig. 3 is a cross-section on line 3—3 of Fig. 1, the lower half being omitted.

According to the invention, as compared with the patent application Serial Number 348,914 not only the walls 1, 2 and 3 but also the front wall 20 are composed of water circulating chambers. Heating pockets 4 are also vertically arranged uniformly distributed over the cross-section in the jackets 1, 2, 3 and 20 and communicate with the water chambers 1, 2 and 20. The burner 21, which for example is shown as a gas burner in the drawings, is interchangeably arranged in the apparatus directly under the heating flues 4. The combustion air enters through the opening 22 of the bottom plate 23 which is not screwed on tightly. The water, entering the lateral chambers 3 at the bottom through the sockets 14 connecting with the water main, first rises in the jackets 3, 2, 20, is then forced by the distributing plate 24 closing the outer chambers to enter uniformly into all the chambers 4, 2, 3 and 20 in the direction of arrow E, so that the water, uniformly distributed in all the chambers of the apparatus, rises to the collecting chamber 12 to be discharged through the pipe 13 at the point of use for example a bath. The heating gases flow through the heating flues 7 formed by the water chambers 4, unite in the collecting chamber 9 from which they reach the chimney 11.

The same apparatus may also be used with the omission of the source of heat 21 for preparing hot water, in that, instead of the heating gases, steam or hot water is made to flow through the apparatus in the opposite direction. In this case the bottom 23 is hermetically closed, the opening 22 being omitted, and the steam or the hot water is introduced through the two nipples 11 at the top and discharged through the lower nipples 25 which are connected with the condensation piping. The distributing plates 8 have perforations 26 whereby the steam or hot water admitted is well distributed. In order to prevent the chambers 4 becoming distorted by the heat ribs 27 are provided between the chambers 4 in staggered arrangement.

I claim:

A water heating apparatus comprising in combination, a combustion chamber, a water jacket surrounding said combustion chamber, a water chamber connected to said water jacket and forming the top of said combustion chamber, spaced transverse water legs opening into opposite sides of said water jacket and into said water chamber, water inlets adjacent the bottom of said water jacket, a baffle extending around said jacket above the said inlets and arranged to constrain the incoming water to flow into said water legs, and a flue in said water chamber into which the spaces between the water legs open.

In testimony whereof I affix my signature.

JOSEF PRINZ.